(12) United States Patent
Zhan et al.

(10) Patent No.: US 11,095,225 B2
(45) Date of Patent: Aug. 17, 2021

(54) POWER SUPPLY APPARATUS AND CONTROL METHOD THEREOF

(71) Applicant: Delta Electronics, Inc., Taoyuan (TW)

(72) Inventors: Kailiang Zhan, Taoyuan (TW); Xiaobing Rong, Taoyuan (TW); Xinwei Liu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/863,519

(22) Filed: Apr. 30, 2020

(65) Prior Publication Data

US 2020/0382007 A1    Dec. 3, 2020

(30) Foreign Application Priority Data

May 27, 2019  (CN) .......................... 201910445374.7

(51) Int. Cl.
*H02M 3/335* (2006.01)
*H02M 1/14* (2006.01)
*H02M 1/00* (2006.01)

(52) U.S. Cl.
CPC ......... *H02M 3/33515* (2013.01); *H02M 1/14* (2013.01); *H02M 1/0009* (2021.05); *H02M 1/0035* (2021.05)

(58) Field of Classification Search
None
See application file for complete search history.

(56) References Cited

U.S. PATENT DOCUMENTS

| 7,327,127 B2 * | 2/2008 | Ho ..................... H02M 3/1588 323/271 |
| 2010/0102788 A1 * | 4/2010 | Kuroyabu ............. H02M 3/156 323/282 |
| 2014/0009978 A1 | 1/2014 | Brinlee et al. |
| 2014/0036552 A1 | 2/2014 | Saji |
| 2015/0229212 A1 * | 8/2015 | Shiwaya ............... H02M 3/158 323/282 |

(Continued)

FOREIGN PATENT DOCUMENTS

| CN | 102468760 A | 5/2012 |
| CN | 106329895 A | 1/2017 |

(Continued)

*Primary Examiner* — Jeffrey A Gblende
*Assistant Examiner* — Henry E Lee, III
(74) *Attorney, Agent, or Firm* — Kirton McConkie; Evan R. Witt (57) ABSTRACT

A control method for a power supply apparatus is provided. Firstly, at least one of an output voltage or an output current of the resonant converter is sampled. Then, an error signal is generated according to a reference value and at least one of the output voltage or the output current. While the resonant converter is in a burst mode, a first switching signal and a chopping signal are generated according to the error signal. The chopping signal has a chopping period and a duty cycle. The chopping period and the duty cycle are dynamically adjusted according to the error signal. Then, a second switching signal is generated according to the chopping signal and the first switching signal. A switch unit of the resonant converter is turned on or turned off according to the second switching signal.

26 Claims, 8 Drawing Sheets

(56) References Cited

U.S. PATENT DOCUMENTS

| | | | | |
|---|---|---|---|---|
| 2015/0256060 A1* | 9/2015 | Faingersh | ............... | H02M 1/36 |
| | | | | 323/267 |
| 2015/0349645 A1 | 12/2015 | Wei et al. | | |
| 2015/0357927 A1 | 12/2015 | Zhang et al. | | |
| 2016/0049860 A1* | 2/2016 | Ihs | ...................... | H02M 3/1588 |
| | | | | 323/282 |
| 2018/0375434 A1* | 12/2018 | Biziitu | ................ | H02M 3/1588 |

FOREIGN PATENT DOCUMENTS

| | | |
|---|---|---|
| CN | 106787771 A | 5/2017 |
| CN | 109004839 A | 12/2018 |
| CN | 109802569 A | 5/2019 |
| TW | I530076 B | 4/2016 |
| WO | 2016054565 A1 | 4/2016 |
| WO | 2018126167 A1 | 7/2018 |

\* cited by examiner

POWER SUPPLY APPARATUS AND CONTROL METHOD THEREOF

FIELD OF THE INVENTION

The present disclosure relates to a power supply apparatus and a control method, and more particularly to a power supply apparatus and a control method for enhancing the power quality.

BACKGROUND OF THE INVENTION

Nowadays, almost all electronic devices are equipped with a power supply apparatus, so that the power supply apparatus provides electric power to the circuits or the electronic components within the electronic device. In some applications, the power supply apparatus including a resonant converter is widely used. The resonant converter receives electric power and is operated in resonance, so that the electric power is converted into different output voltages at different frequencies.

In a conventional resonant converter, a switch element is selectively turned on or turned off according to an original switching signal. However, in case that the resonant converter is operated at a specified frequency (e.g., a high frequency), the resonant converter enters a burst mode. In the burst mode, the switch element is selectively turned on or turned off according to a real switching signal, which is generated by a hopping signal and the original switching signal.

Figure 1:
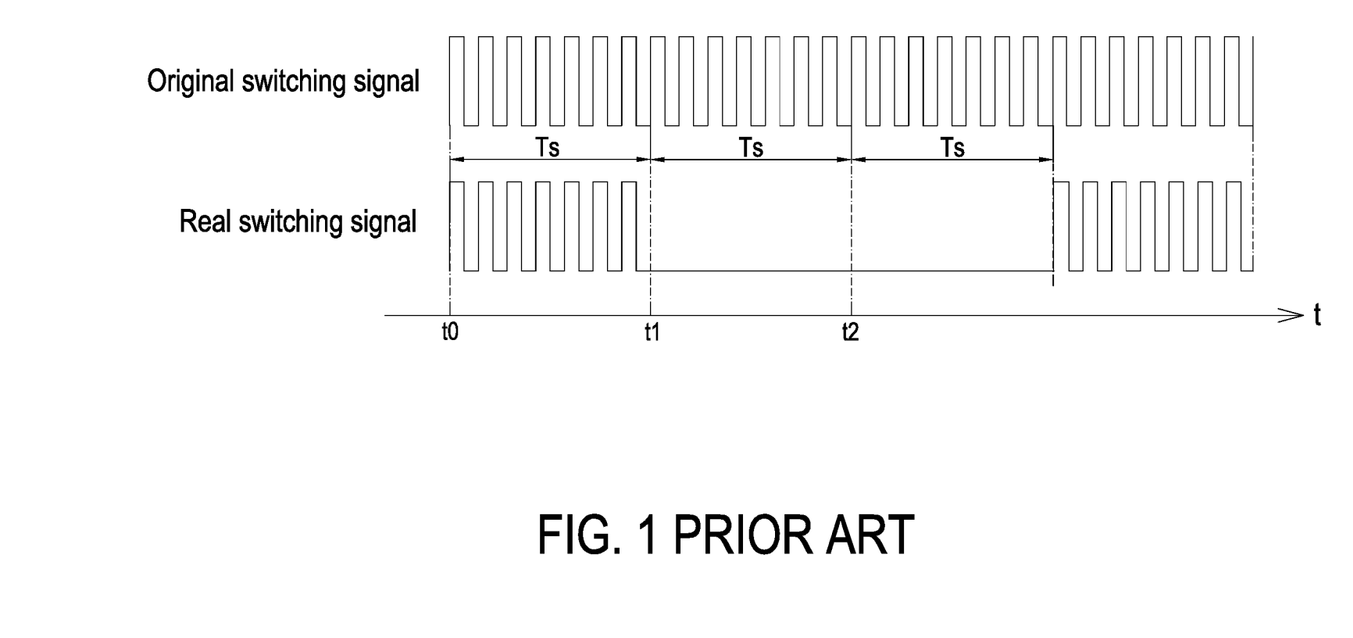
FIG. 1 is a schematic timing waveform diagram illustrating an original switching signal and a real switching signal of a conventional resonant converter while the resonant converter is in a burst mode.

FIG. 1 is a schematic timing waveform diagram illustrating an original switching signal and a real switching signal of a conventional resonant converter while the resonant converter is in a burst mode. When the resonant converter enters a burst mode, the real switching signal is generated according to the original switching signal and the hopping signal. The hopping signal has a fixed switching period Ts (i.e., a loop control period) and the hopping signal is maintained in a high level state or a low level state during one switching period Ts. During the first switching period Ts of the original switching signal (i.e., the time interval between t0 and t1), the hopping signal is maintained in the high level state. Consequently, the real switching signal coincides with the original switching signal. During the second switching period Ts of the original switching signal (i.e., the time interval between t1 and t2), the hopping signal is maintained in the low level state. Consequently, the real switching signal is in an off state.

As mentioned above, the conventional resonant converter is operated according to the real switching signal. The real switching signal is determined according to the original switching signal and the hopping signal with the fixed switching period Ts. However, the above method still has some drawbacks. For example, the ripple of the output voltage is increased, and the power quality of the power supply apparatus is deteriorated. For reducing the ripple of the output voltage, it is necessary to reduce a control period of the control loop. Under this circumstance, lots of software resources are occupied.

Therefore, there is a need of providing a power supply apparatus and a control method in orders to overcome the drawbacks of the conventional technologies.

SUMMARY OF THE INVENTION

The present disclosure provides a power supply apparatus and a control method for reducing the output voltage ripple, increasing the power quality and reducing the designing complexity.

In accordance with an aspect of the present disclosure, a control method for a power supply apparatus is provided. The power supply apparatus includes a resonant converter. The control method includes the following steps. Firstly, at least one of an output voltage or an output current of the resonant converter is sampled. Then, an error signal is generated according to a reference value and at least one of the output voltage and the output current. While the resonant converter is in a burst mode, a first switching signal and a chopping signal are generated according to the error signal. The chopping signal has a chopping period and a duty cycle. The chopping period and the duty cycle are dynamically adjusted according to the error signal. Then, a second switching signal is generated according to the chopping signal and the first switching signal. A switch unit of the resonant converter is turned on or turned off according to the second switching signal.

In accordance with another aspect of the present disclosure, a power supply apparatus is provided. The power supply apparatus includes a resonant converter, a sampling circuit, an error signal generator, a controller and a logic computation unit. The resonant converter has an output voltage or an output current. The sampling circuit is electrically connected with the resonant converter. The sampling circuit samples at least one of the output voltage or the output current of the resonant converter. The error signal generator is electrically connected with the sampling circuit. The error signal generator receives a reference value and at least one of the output voltage or the output current, and an error signal is generated according to the reference value and at least one of the output voltage or the output current. The controller is electrically connected with the error signal generator, and a first switching signal and a chopping signal with a chopping period and a duty cycle are generated. While the resonant converter is in a burst mode, the chopping period and the duty cycle are dynamically adjusted according to the error signal. The logic computation unit is electrically connected with the controller and the resonant converter, and generates a second switching signal according to the chopping signal and the first switching signal. A switch unit of the resonant converter is turned on or turned off according to the second switching signal.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 2:
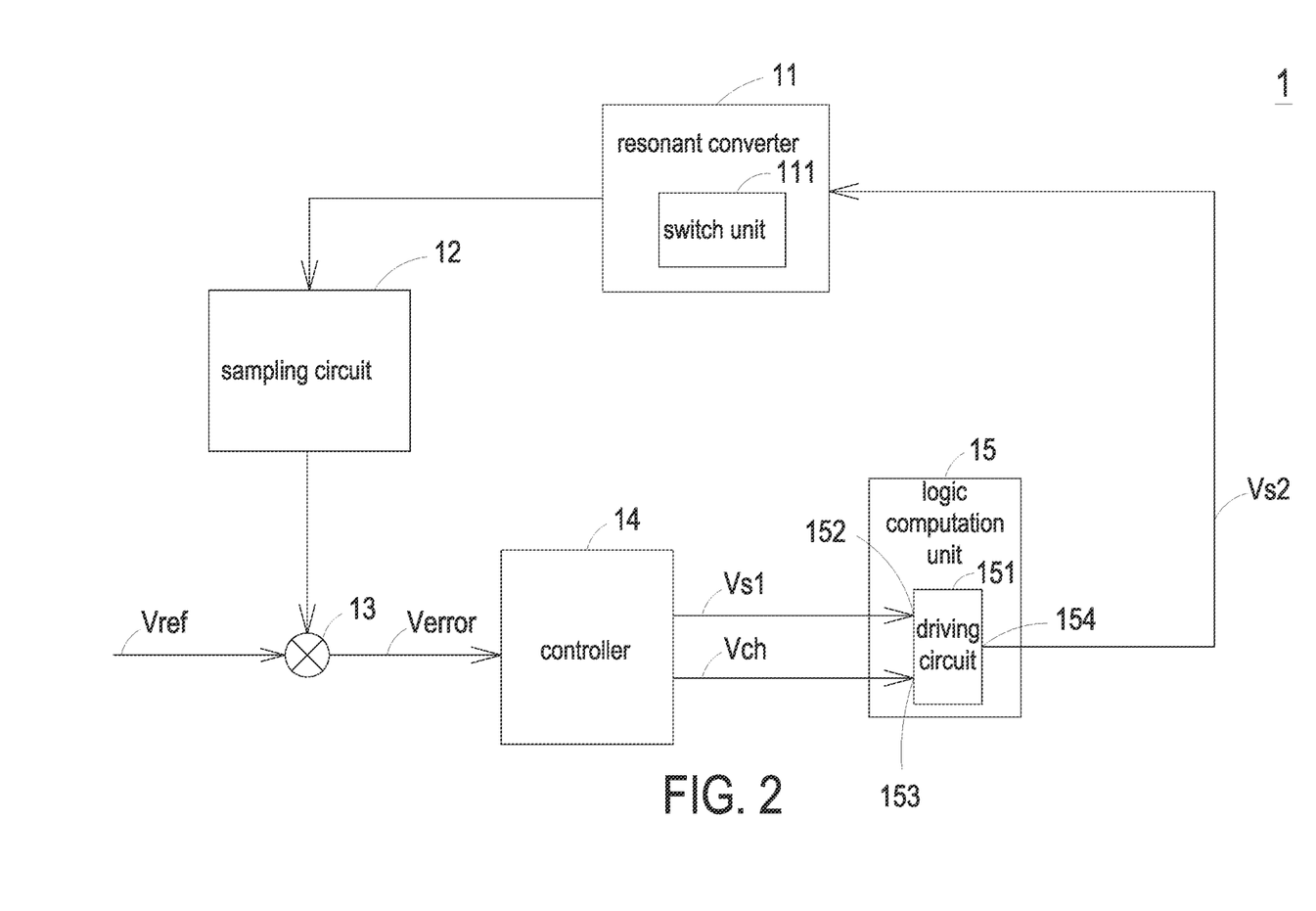
FIG. 2 is a schematic circuit diagram illustrating the architecture of a power supply apparatus according to a first embodiment of the present disclosure.
Figure 3:
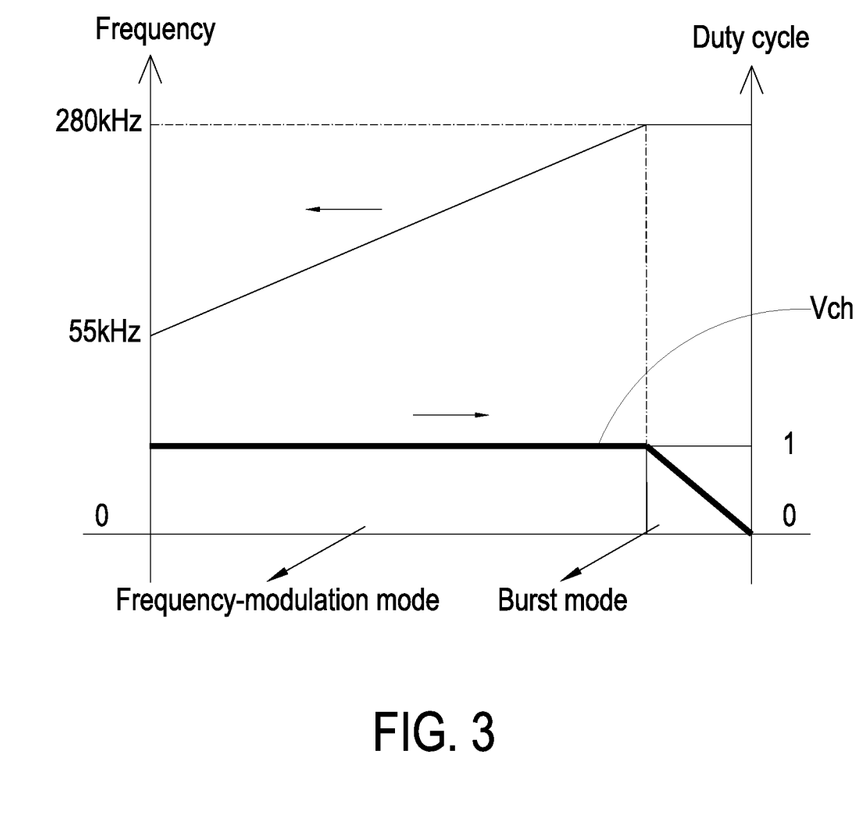
FIG. 3 is a plot illustrating the relationships between the working frequencies and the duty cycles of the chopping signal provided by the power supply apparatus as shown in FIG. 2.

Please refer to FIGS. 2 and 3. FIG. 2 is a schematic circuit diagram illustrating the architecture of a power supply apparatus according to a first embodiment of the present disclosure. FIG. 3 is a plot illustrating the relationships between the working frequencies and the duty cycles of the chopping signal provided by the power supply apparatus as shown in FIG. 2. The power supply apparatus 1 comprises a resonant converter 11, a sampling circuit 12, an error computation circuit 13, a controller 14 and a logic computation unit 15. Preferably but not exclusively, the resonant converter 11 is a three-phase LLC resonant circuit. The resonant converter 11 receives an input power. The input power contains an input voltage and an input current. The resonant converter 11 includes a switch unit 111. The switch unit 111 is selectively turned on or turned off. Consequently, the input power is converted into an output power by the resonant converter 11. When the switch unit 111 is turned on, the magnitude of the output power is increased by the resonant converter 11 according to the input power. When the switch unit 111 is turned off, the input power is not converted and thus the magnitude of the output power is decreased.

The sampling circuit 12 is electrically connected with the resonant converter 11. After the output power from the resonant converter 11 is sampled by the sampling circuit 12, a sampling result containing the output power is obtained. The error computation circuit 13 is electrically connected with the sampling circuit 12. The error computation circuit 13 receives the sample result from the sampling circuit 12. After the error computation circuit 13 performs a computation on the sample result and a reference value Vref, an error signal Verror is generated. The output power contains an output voltage and an output current. When the output power is sampled, the output voltage and/or the output current are sampled.

The controller 14 is electrically connected with the error computation circuit 13. The controller 14 issues a first switching signal Vs1. Preferably but not exclusively, the first switching signal Vs1 is a digital signal. The controller 14 further receives the error signal Verror. According to the error signal Verror, the controller 14 adjusts the first switching signal Vs1. Moreover, according to the error signal Verror, the controller 14 judges whether the resonant converter 11 is in a frequency-modulation mode or a burst mode. In some embodiments, the controller 14 confirms whether the resonant converter 11 is in the frequency-modulation mode or the burst mode according to the error signal Verror and the switching frequency of the resonant converter 11. While the switching frequency of the resonant converter 11 is higher than or equal to a threshold value (e.g., 280 kHz) as shown in FIG. 3, the controller 14 judges that the resonant converter 11 is in the burst mode. Whereas, while the switching frequency of the resonant converter 11 is lower than the threshold value, the controller 14 judges that the resonant converter 11 is in the frequency-modulation mode. The error computation circuit 13 and the controller 14 are independent circuits. In some embodiments, the error computation circuit 13 and the controller 14 are integrated into a control chip (not shown) of the power supply apparatus 1. For example, the control chip is a digital signal processor (DSP) or a field programmable gate array (FPGA) chip.

After the controller 14 confirms that the resonant converter 11 is in the burst mode, the controller 14 further issues a chopping signal Vch according to the error signal Verror. The chopping signal Vch is adjustable according to the error signal Verror. In one embodiment, the chopping signal Vch is adjustable according to the error signal Verror using a look-up table method and a table representing the relationship between the chopping signal Vch and the error signal Verror can be referenced. Preferably but not exclusively, the chopping signal Vch is a digital signal. Moreover, the chopping signal Vch has a chopping period and a duty cycle. The chopping period and the duty cycle are dynamically adjusted according to the error signal Verror.

The logic computation unit 15 is electrically connected with the controller 14 and the resonant converter 11. The logic computation unit 15 receives the first switching signal Vs1 and the chopping signal Vch from the controller 14. After the logic computation unit 15 performs a logic operation on the first switching signal Vs1 and the chopping signal Vch, a second switching signal Vs2 is generated. According to the second switching signal Vs2, the switch unit 111 of the resonant converter 11 is selectively turned on or turned off. Preferably but not exclusively, the second switching signal Vs2 is a digital signal. In an embodiment, the second switching signal Vs2 is generated after the logic computation unit 15 performs an AND operation on the first switching signal Vs1 and the chopping signal Vch. Preferably but not exclusively, the logic operation is implemented through a software component or a hardware component. In an embodiment, the logic computation unit 15 is an independent circuit. In some other embodiments, the logic computation unit 15 and the controller 14 are integrated into the control chip (not shown) of the power supply apparatus 1. Alternatively, the functions of the controller 14 and the logic computation unit 15 are implemented through the software component.

As mentioned above, the controller 14 of the power supply apparatus 1 adjusts the chopping signal Vch according to the error signal Verror. Consequently, the chopping period and the duty cycle of the chopping signal Vch are dynamically adjustable. Comparing with the conventional power supply apparatus, in which the hopping signal is discontinuously switched between the low level state and the high level state with the fixed period, the chopping period and the duty cycle of the chopping signal Vch in the power supply apparatus 1 of the present disclosure are dynamically adjustable and the second switching signal Vs2 is adjusted according to the chopping signal Vch, the ripple of the output voltage from the power supply apparatus 1 is reduced and the power quality of the power supply apparatus 1 is enhanced. Under this circumstance, the problem of wasting the software resources is avoided and the complexity of the power supply apparatus 1 is reduced.

After the controller 14 confirms that the resonant converter 11 is in the frequency-modulation mode according to the error signal Verror, the controller 14 also issues a chopping signal Vch having a fixed voltage level. In one embodiment, the chopping signal Vch can be related to the error signal Verror. When the resonant converter 11 is in the frequency-modulation mode, the switching period of the first switching signal Vs1 is changed according to the error signal Verror. Moreover, the chopping signal Vch has a fixed voltage level. For example, the chopping signal Vch is in a high level state. Consequently, when the resonant converter 11 is in the frequency-modulation mode, the second switching signal Vs2 obtained according to the first switching signal Vs1 and the chopping signal Vch is identical to the first switching signal Vs1.

Please refer to FIG. 2 again. The logic computation unit 15 includes a driving circuit 151. The driving circuit 151 is electrically connected with the switch unit 111 of the resonant converter 11 for driving the switch unit 111. Preferably but not exclusively, the driving circuit 151 is an IC chip. The driving circuit 151 has an input terminal 152, an enabling terminal 153 and an output terminal 154. The input terminal 152 of the driving circuit 151 is electrically connected with the controller 14 to receive the first switching signal Vs1. The enabling terminal 153 of the driving circuit 151 is electrically connected with the controller 14 to receive the chopping signal Vch. After the logic computation unit 15 performs the logic operation on the first switching signal Vs1 and the chopping signal Vch, the second switching signal Vs2 is generated. The second switching signal Vs2 is outputted from the output terminal 154 of the driving circuit 151 to the switch unit 111. Preferably but not exclusively, the logic operation is implemented by the logic computation unit 15 through a software component or a hardware component.

Figure 4:
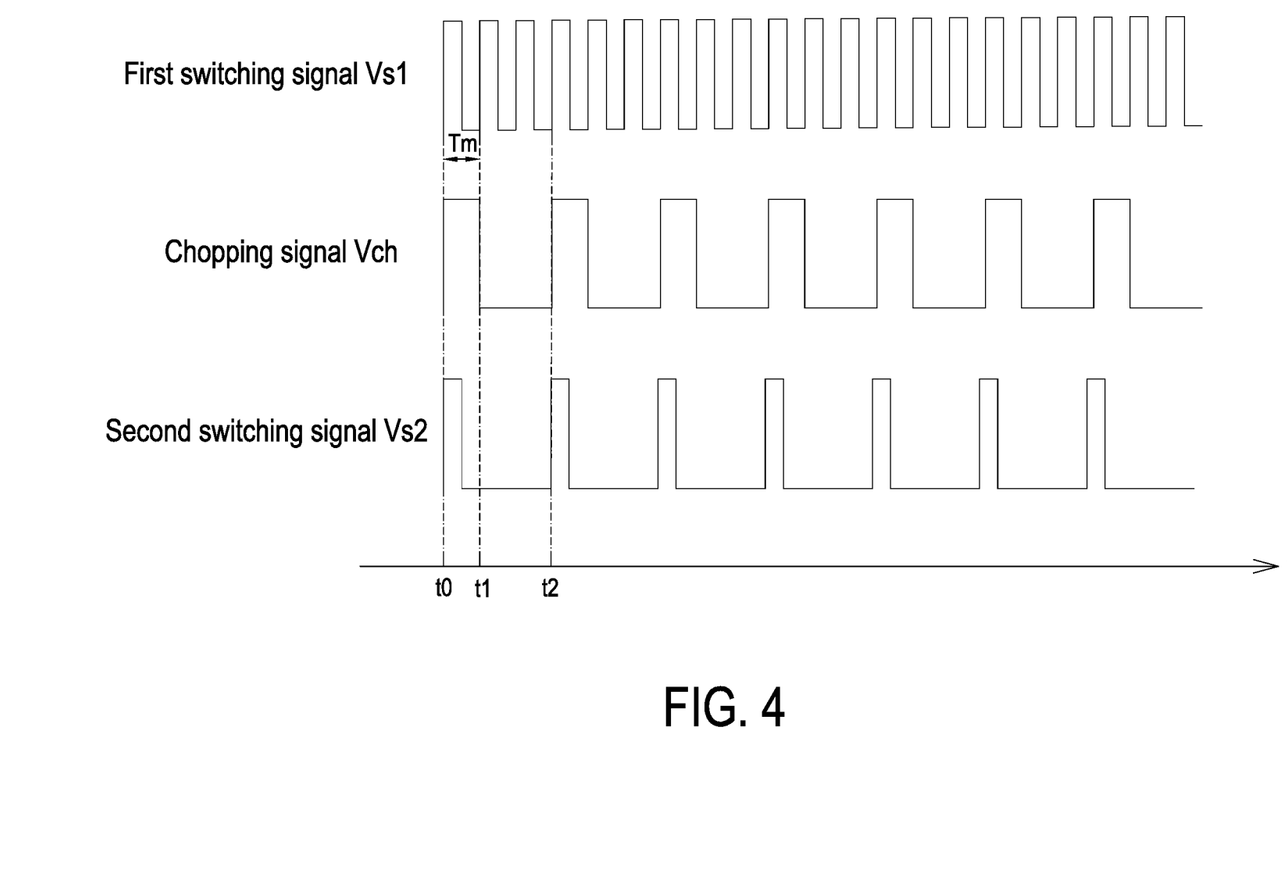
FIG. 4 is a schematic timing waveform diagram illustrating the first switching signal, the chopping signal and the second switching signal of the power supply apparatus as shown in FIG. 2.

FIG. 4 is a schematic timing waveform diagram illustrating the first switching signal, the chopping signal and the second switching signal of the power supply apparatus as shown in FIG. 2. As shown in FIG. 4, the first switching signal Vs1 has a fixed switching period Tm. In the time interval between t0 and t1, the chopping signal Vch is in the high level state (i.e., an on state). In this situation, the voltage level of the first switching signal Vs1 coincides with the voltage level of the second switching signal Vs2. In the time interval between t1 and t2, the chopping signal Vch is in the low level state (i.e., an off state). In this situation, the voltage level of the first switching signal Vs1 and the voltage level of the second switching signal Vs2 are pulled down to the low level state, for example 0V.

In some embodiments, the duty cycle of the chopping signal Vch from the controller 14 is adjustable. As the on period Ton and the off period Toff of the chopping signal Vch are changed, the duty cycle and the chopping period of the chopping signal Vch are changed.

Figure 5:
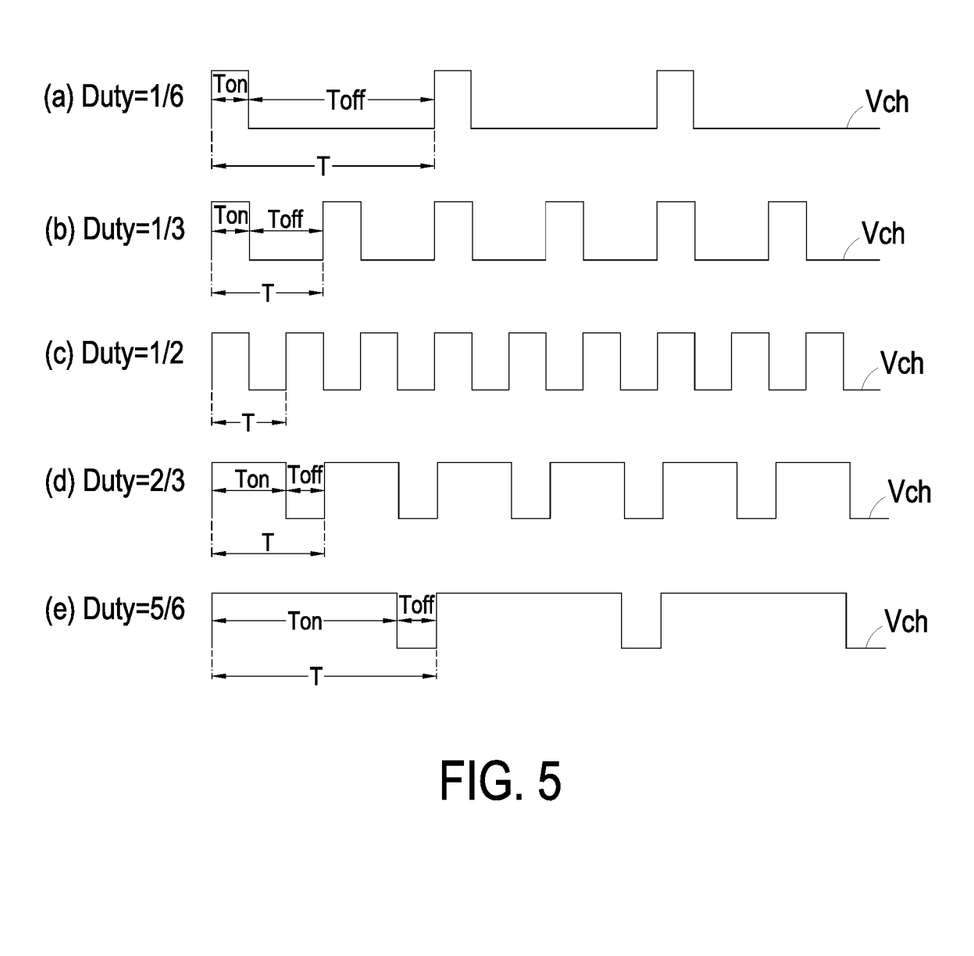
FIG. 5 is a schematic timing waveform diagram illustrating some examples of the chopping signal of the power supply apparatus as shown in FIG. 2.

FIG. 5 is a schematic timing waveform diagram illustrating some examples of the chopping signal of the power supply apparatus as shown in FIG. 2. As shown in FIG. 5, each chopping signal Vch has a chopping period T and a duty cycle, and the chopping period T of each chopping signal Vch contains an on period Ton and the off period Toff. In the example (a) of FIG. 5, the ratio of the on period Ton to the off period Toff is 1:6. Consequently, the duty cycle of the chopping signal Vch is 1/6. In the example (b) of FIG. 5, the ratio of the on period Ton to the off period Toff is 1:3. Consequently, the duty cycle of the chopping signal Vch is 1/3. In the example (c) of FIG. 5, the ratio of the on period Ton to the off period Toff is 1:2. Consequently, the duty cycle of the chopping signal Vch is 1/2. In the example (d) of FIG. 5, the ratio of the on period Ton to the off period Toff is 2:3. Consequently, the duty cycle of the chopping signal Vch is 2/3. In the example (e) of FIG. 5, the ratio of the on period Ton to the off period Toff is 5:6. Consequently, the duty cycle of the chopping signal Vch is 5/6.

Since the resonant converter 11 is capable of stabilizing the output power according to the second switching signal Vs2, the ripple of the output voltage is reduced and the power quality of the power supply apparatus 1 is enhanced.

The duty cycle of the chopping signal Vch can be set according to the following strategies. In case that the controller 14 intends to output the chopping signal Vch with the duty cycle lower than 50%, the on period Ton of the chopping signal Vch is set to be a fixed value. For example, the on period Ton is equal to the switching period Tm of the first switching signal Vs1. Under this circumstance, the minimum pulse output is achieved, and the control precision is enhanced. In addition, the off period Toff of the chopping signal Vch is changed according to the error signal Verror. In case that the controller 14 intends to output the chopping signal Vch with the duty cycle higher than 50%, the off period Toff of the chopping signal Vch is set to be a fixed value. For example, the off period Toff is equal to the switching period Tm of the first switching signal Vs1. In addition, the on period Ton of the chopping signal Vch is changed according to the error signal Verror. Since the voltage level of the second switching signal Vs2 is adjusted according to the chopping signal Vch, the voltage level of the second switching signal Vs2 is more uniform and the power quality is further enhanced. It is noted that numerous modifications may be made while retaining the teachings of the present disclosure. For example, in case that the controller 14 intends to output the chopping signal Vch with the duty cycle lower than 50%, the on period Ton of the chopping signal Vch is set to be an integer multiple of the switching period Tm. Alternatively, in case that the controller 14 intends to output the chopping signal Vch with the duty cycle higher than 50%, the off period Toff of the chopping signal Vch is set to be an integer multiple of the switching period Tm.

In some embodiments, the chopping signal Vch from the controller 14 is defined by a single signal or a plurality of control signals collaboratively. Consequently, the control precision is enhanced. For example, the chopping signal Vch is obtained after a first control signal, a second control signal, a third control signal and a fourth control signal are subjected to a logic OR operation. For example, the chopping signal Vch with the duty cycle of 4/11 may be acquired according to this method.

Figure 6:
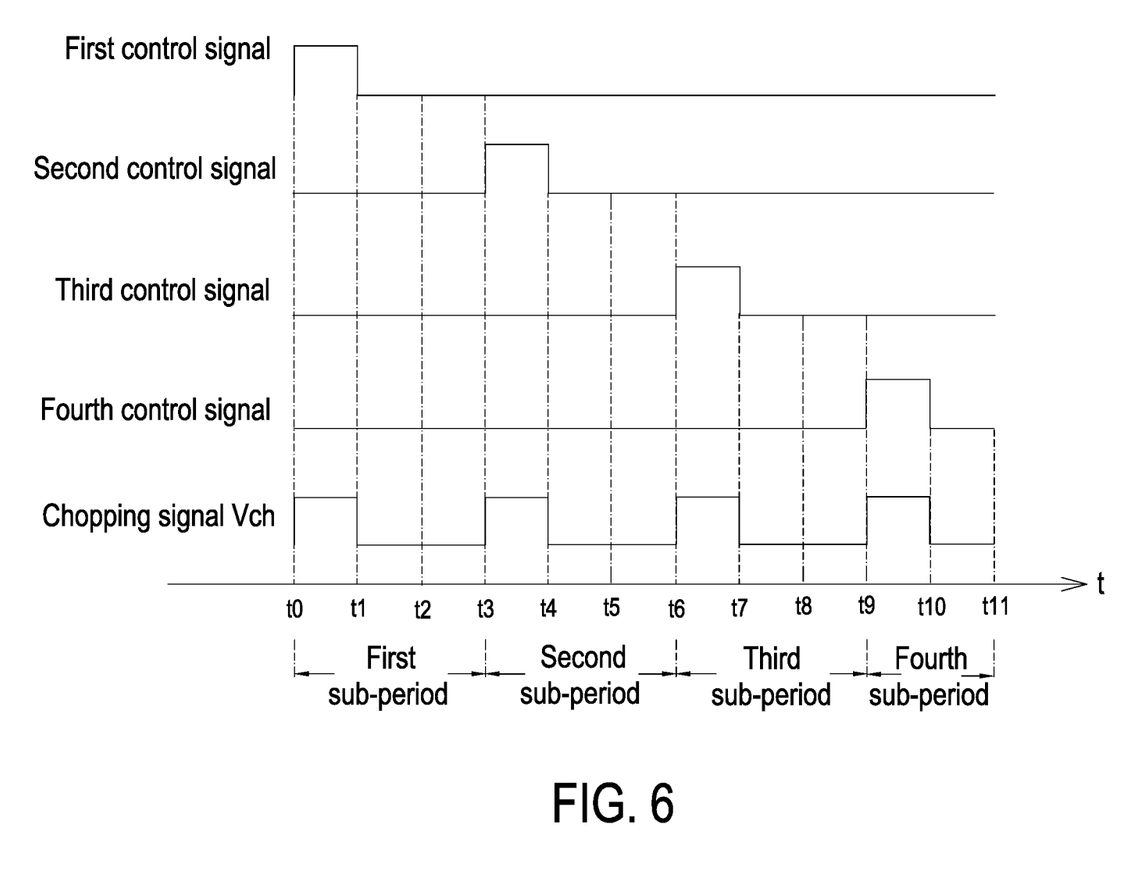
FIG. 6 is a schematic timing waveform diagram illustrating a method of acquiring a chopping signal with the duty cycle of 4/11 through a plurality of control signals.

FIG. 6 is a schematic timing waveform diagram illustrating a method of acquiring a chopping signal with the duty cycle of 4/11 through a plurality of control signals. As shown in FIG. 6, one chopping period T of the chopping signal Vch is divided into a first sub-period, a second sub-period, a third sub-period and a fourth sub-period. The time interval between t0 and t3 is the first sub-period corresponding to the first control signal. The time interval between t3 and t6 is the second sub-period corresponding to the second control signal. The time interval between t6 and t9 is the third sub-period corresponding to the third control signal. The time interval between t9 and t12 is the fourth sub-period corresponding to the fourth control signal.

Please refer to FIG. 6. In the time interval between t0 and t1, the first control signal is in the high level state. In the time interval between t1 and t3, the first control signal is in the low level state. That is, the first segment of the first sub-period (i.e., one switching period Tm) is in the high level state (1on), and the last two segments of the first sub-period are in the low level state (2off). Consequently, the chopping signal Vch is in the high level state in the time interval between t0 and t1 of the first sub-period, and the chopping signal Vch is in the low level state in the time interval between t1 and t3 of the first sub-period. In the time interval between t3 and t4, the second control signal is in the high level state. In the time interval between t4 and t6, the second control signal is in the low level state. That is, the first segment of the second sub-period (i.e., one switching period Tm) is in the high level state (1on), and the last two segments of the second sub-period are in the low level state (2off). Consequently, the chopping signal Vch is in the high level state in the time interval between t3 and t4 of the second sub-period, and the chopping signal Vch is in the low level state in the time interval between t4 and t6 of the second sub-period. In the time interval between t6 and t7, the third control signal is in the high level state. In the time interval between t7 and t9, the third control signal is in the low level state. That is, the first segment of the third sub-period (i.e., one switching period Tm) is in the high level state (1on), and the last two segments of the third sub-period are in the low level state (2off). Consequently, the chopping signal Vch is in the high level state in the time interval between t6 and t7 of the third sub-period, and the chopping signal Vch is in the low level state in the time interval between t7 and t9 of the third sub-period. In the time interval between t9 and t10, the fourth control signal is in the high level state. In the time interval between t10 and t11, the fourth control signal is in the low level state. That is, the first segment of the fourth sub-period (i.e., one switching period Tm) is in the high level state (1on), and the last segment of the fourth sub-period (1off) is in the low level state. Consequently, the chopping signal Vch is in the high level state in the time interval between t9 and t10 of the fourth sub-period, and the chopping signal Vch is in the low level state in the time interval between t10 and t11 of the fourth sub-period.

Similarly, the chopping signal Vch with any desired duty cycle may be obtained by using the above method. That is, the chopping period is divided into a plurality of sub-periods, and the voltage levels of the chopping signal Vch in each sub-period are determined according to at least one control signal. Some chopping signals Vch with different duty cycles and defined by four control signals and four sub-periods will be listed in a table as shown in Table 1. It is noted that the numbers of the control signals and the sub-periods to obtain the chopping signal Vch are not restricted.

TABLE 1

Relationships between the duty cycle, the on period, the chopping period and the sub-periods of the chopping signal

| Duty cycle | On period Ton:Chopping period T | First sub-period | Second sub-period | Third sub-period | Fourth sub-period |
| --- | --- | --- | --- | --- | --- |
| 1/3 | 1:3 | 1 on 2 off | 1 on 2 off | 1 on 2 off | 1 on 2 off |
| 4/11 | 4:11 | 1 on 2 off | 1 on 2 off | 1 on 2 off | 1 on 1 off |
| 4/10 | 4:10 | 1 on 2 off | 1 on 1 off | 1 on 2 off | 1 on 1 off |
| 4/9 | 4:9 | 1 on 2 off | 1 on 1 off | 1 on 1 off | 1 on 1 off |
| 1/2 | 1:2 | 1 on 1 off | 1 on 1 off | 1 on 1 off | 1 on 1 off |

Figure 7:
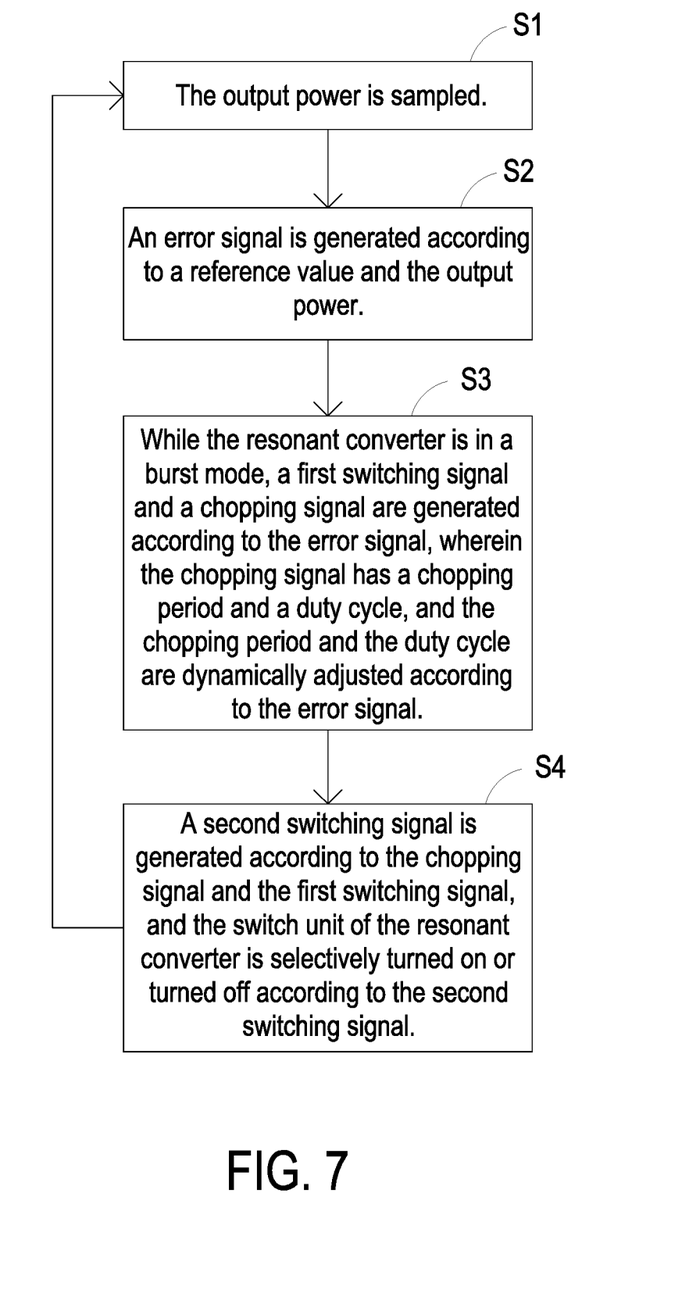
FIG. 7 is a flowchart of a control method for the power supply apparatus according to an embodiment of the present disclosure.

FIG. 7 is a flowchart of a control method for the power supply apparatus according to an embodiment of the present disclosure. Firstly, in a step S1, the output power is sampled. In a step S2, an error signal Verror is generated according to a reference value Vref and the output power. In a step S3, while the resonant converter 11 is in a burst mode, a first switching signal Vs1 and a chopping signal Vch are generated according to the error signal Verror. The chopping signal Vch has a chopping period and a duty cycle. The chopping period and the duty cycle are dynamically adjusted according to the error signal Verror. In a step S4, a second switching signal Vs2 is generated according to the chopping signal Vch and the first switching signal Vs1. According to the second switching signal Vs2, the switch unit 111 of the resonant converter 11 is selectively turned on or turned off. After the step S4, the step S1 is repeatedly done.

Figure 8:
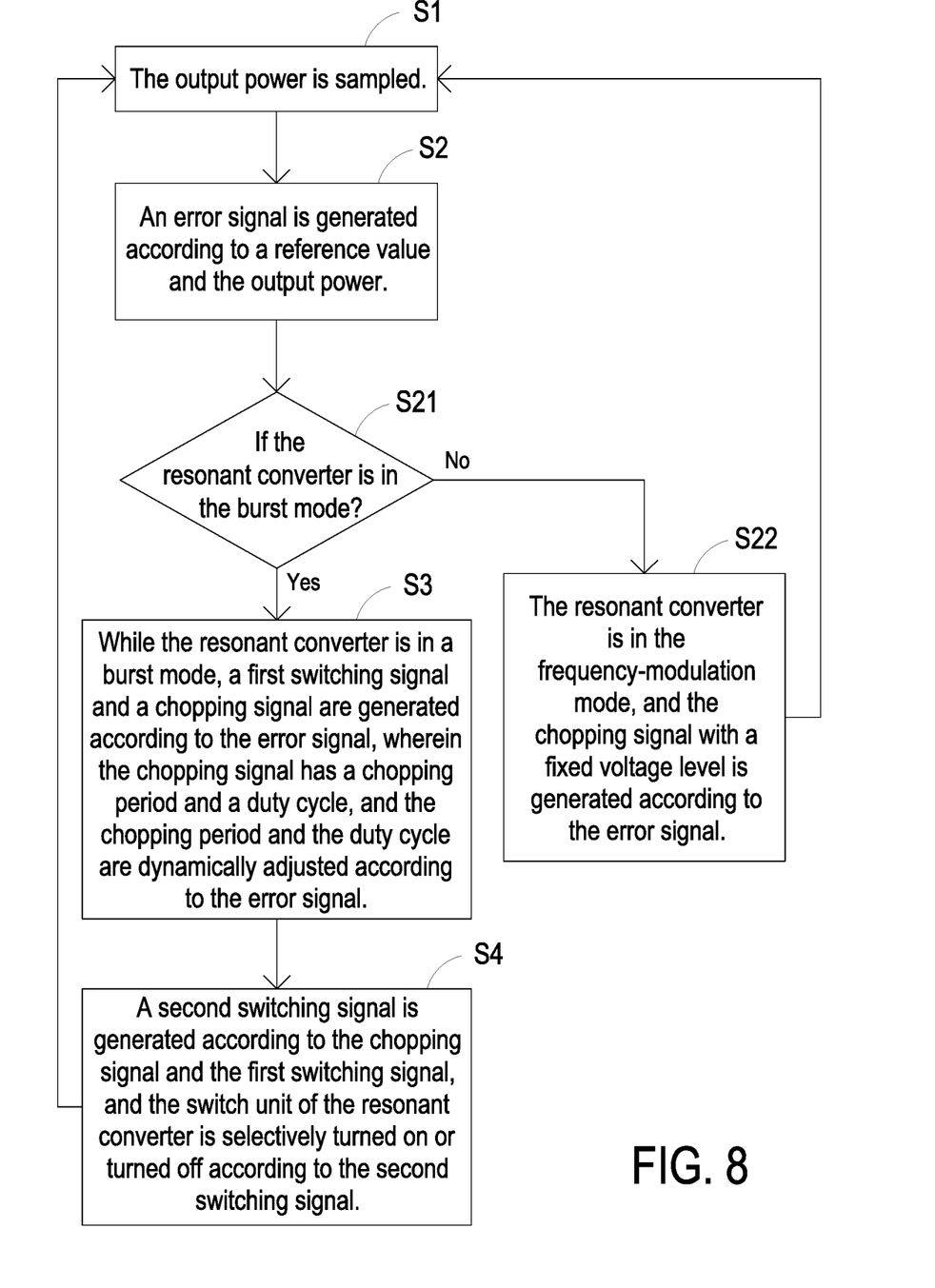
FIG. 8 is a flowchart of a control method for the power supply apparatus according to another embodiment of the present disclosure.

FIG. 8 is a flowchart of a control method for the power supply apparatus according to another embodiment of the present disclosure. In comparison with the control method of FIG. 7, the control method of this embodiment further includes steps S21 and S22 after the step S2. After the step S2, the step S21 is performed to judge whether the resonant converter 11 is in the burst mode. If the judging result of the step S21 is satisfied, the step S3 is performed. If the judging result of the step S21 is not satisfied, the step S22 is performed. In the step S22, the resonant converter 11 is in the frequency-modulation mode, and the chopping signal Vch with a fixed voltage level is generated according to the error signal Verror, and the second switching signal Vs2 is identical to the first switching signal Vs1. After the step S22, the step S1 is repeatedly done. The steps S1, S2, S3 and S4 of this embodiment are identical to those of FIG. 7, and are not redundantly described herein. The control methods of FIGS. 7 and 8 can be applied to the power supply apparatus of FIG. 2. It is noted that the applications of the control method are not restricted.

From the above descriptions, the present disclosure provides the power supply apparatus and the control method. The controller adjusts the chopping signal according to the error signal. Consequently, the chopping period and the duty cycle of the chopping signal can be dynamically changed. Moreover, the second switching signal is adjusted according to the dynamically-changed chopping signal. Consequently, the ripple of the output voltage from the power supply apparatus is reduced, and the power quality is enhanced. Moreover, since the problem of wasting the software resources is avoided, the complexity of the power supply apparatus is reduced.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A control method for a power supply apparatus, the power supply apparatus comprising a resonant converter, the control method comprising steps of:
sampling at least one of an output voltage or an output current of the resonant converter;
generating an error signal according to a reference value and at least one of the output voltage or the output current;

generating a first switching signal and a chopping signal according to the error signal while the resonant converter is in a burst mode, wherein the chopping signal has a chopping period and a duty cycle, and the chopping period and the duty cycle are dynamically adjusted according to the error signal; and generating a second switching signal according to the chopping signal and the first switching signal, wherein a switch unit of the resonant converter is turned on or turned off according to the second switching signal.

2. The control method according to claim 1, wherein the control method further comprises a step of judging whether the resonant converter is in a frequency-modulation mode, wherein while the resonant converter is in the frequency-modulation mode, the chopping signal has a fixed voltage level, and the second switching signal is identical to the first switching signal.

3. The control method according to claim 1, wherein after a logic AND operation is performed on the chopping signal and the first switching signal by a logic computation unit, the second switching signal is generated.

4. The control method according to claim 3, wherein the logic computation unit comprises a driving circuit, wherein an input terminal of the driving circuit receives the first switching signal, an enabling terminal of the driving circuit receives the chopping signal, and the second switching signal is outputted from an output terminal of the driving circuit.

5. The control method according to claim 1, wherein the chopping period has an on period and an off period, wherein while the duty cycle is lower than 50%, the on period is equal to a switching period of the first switching signal, and the off period is adjusted according to the error signal.

6. The control method according to claim 1, wherein the chopping period has an on period and an off period, wherein while the duty cycle is higher than 50%, the off period is equal to a switching period of the first switching signal, and the on period is adjusted according to the error signal.

7. The control method according to claim 1, wherein while the resonant converter is in the burst mode, a switching period of the first switching signal is fixed.

8. The control method according to claim 2, wherein while the resonant converter is in the frequency-modulation mode, a switching period of the first switching signal is adjusted according to the error signal.

9. The control method according to claim 1, wherein the chopping signal is adjusted according to the error signal using a look-up table method.

10. The control method according to claim 1, wherein the chopping signal, the first switching signal and the second switching signal are digital signals.

11. The control method according to claim 1, wherein while a switching frequency of the resonant converter is higher than or equal to a threshold value, the resonant converter is in the burst mode, wherein while the switching frequency of the resonant converter is lower than the threshold value, the resonant converter is in a frequency-modulation mode.

12. The control method according to claim 1, wherein a switching frequency of the resonant converter is acquired according to the error signal.

13. The control method according to claim 1, wherein the chopping signal is a single signal or contains a plurality of control signals.

14. A power supply apparatus, comprising:
a resonant converter having an output voltage or an output current;

a sampling circuit electrically connected with the resonant converter, wherein the sampling circuit samples at least one of the output voltage or the output current of the resonant converter;

an error signal generator electrically connected with the sampling circuit, wherein the error signal generator receives a reference value and at least one of the output voltage or the output current, and an error signal is generated according to the reference value and at least one of the output voltage or the output current;

a controller electrically connected with the error signal generator, and generating a first switching signal and a chopping signal with a chopping period and a duty cycle, wherein while the resonant converter is in a burst mode, the chopping period and the duty cycle are dynamically adjusted according to the error signal; and a logic computation unit electrically connected with the controller and the resonant converter, and generating a second switching signal according to the chopping signal and the first switching signal, wherein a switch unit of the resonant converter is turned on or turned off according to the second switching signal.

15. The power supply apparatus according to claim 14, wherein while the resonant converter is in a frequency-modulation mode, the chopping signal with a fixed voltage level is generated by the controller according to the error signal, and the second switching signal is identical to the first switching signal.

16. The power supply apparatus according to claim 14, wherein after a logic AND operation is performed on the chopping signal and the first switching signal by the logic computation unit, the second switching signal is generated.

17. The power supply apparatus according to claim 14, wherein the logic computation unit comprises a driving circuit, wherein an input terminal of the driving circuit receives the first switching signal, an enabling terminal of the driving circuit receives the chopping signal, and the second switching signal is outputted from an output terminal of the driving circuit.

18. The power supply apparatus according to claim 14, wherein the chopping period has an on period and an off period, wherein while the duty cycle is lower than 50%, the on period is equal to a switching period of the first switching signal, and the off period is adjusted according to the error signal.

19. The power supply apparatus according to claim 14, wherein the chopping period has an on period and an off period, wherein while the duty cycle is higher than 50%, the off period is equal to a switching period of the first switching signal, and the on period is adjusted according to the error signal.

20. The power supply apparatus according to claim 14, wherein while the resonant converter is in the burst mode, a switching period of the first switching signal is fixed.

21. The power supply apparatus according to claim 15, wherein while the resonant converter is in the frequency-modulation mode, a switching period of the first switching signal is adjusted according to the error signal.

22. The power supply apparatus according to claim 14, wherein the chopping signal is adjusted according to the error signal using a look-up table method.

23. The power supply apparatus according to claim 14, wherein the chopping signal, the first switching signal and the second switching signal are digital signals.

24. The power supply apparatus according to claim 14, wherein while a switching frequency of the resonant converter is higher than or equal to a threshold value, the resonant converter is in the burst mode, wherein while the switching frequency of the resonant converter is lower than the threshold value, the resonant converter is in a frequency-modulation mode.

25. The power supply apparatus according to claim 14, wherein a switching frequency of the resonant converter is acquired according to the error signal.

26. The power supply apparatus according to claim 14, wherein the chopping signal is a single signal or contains a plurality of control signals.

* * * * *